United States Patent
Gallhauser et al.

(10) Patent No.: US 10,992,393 B1
(45) Date of Patent: Apr. 27, 2021

(54) SYSTEM, TEST SETUP AS WELL AS METHOD FOR PERFORMING MIMO TESTS

(71) Applicant: Rohde & Schwarz GmbH & Co. KG, Munich (DE)

(72) Inventors: Markus Gallhauser, Munich (DE); Nino Voss, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/727,206

(22) Filed: Dec. 26, 2019

(51) Int. Cl.
| | |
|---|---|
| H04W 24/06 | (2009.01) |
| H04B 17/00 | (2015.01) |
| H04B 7/0413 | (2017.01) |
| H04B 3/46 | (2015.01) |
| H04B 17/309 | (2015.01) |
| H04L 5/00 | (2006.01) |

(52) U.S. Cl.
CPC ........... *H04B 17/0085* (2013.01); *H04B 3/46* (2013.01); *H04B 7/0413* (2013.01); *H04B 17/309* (2015.01); *H04L 5/0048* (2013.01); *H04W 24/06* (2013.01)

(58) Field of Classification Search
USPC .......................................... 375/224; 370/331
See application file for complete search history.

(56) References Cited

U.S. PATENT DOCUMENTS

| | | | | |
|---|---|---|---|---|
| 8,730,915 | B2* | 5/2014 | Cheng ............... | H04W 36/0083 370/331 |
| 2014/0161164 | A1* | 6/2014 | Emmanuel ........... | H04B 5/0043 375/224 |
| 2015/0017928 | A1* | 1/2015 | Griesing ............ | H04B 17/0087 455/67.14 |
| 2015/0180591 | A1* | 6/2015 | Olgaard ............... | H04B 7/0837 375/224 |
| 2016/0180591 | A1* | 6/2016 | Shiu ........................ | G06F 3/013 345/633 |
| 2017/0214477 | A1* | 7/2017 | Joung .................... | H04W 52/42 |
| 2017/0223559 | A1 | 8/2017 | Kong et al. | |
| 2017/0373773 | A1* | 12/2017 | Jing ...................... | H04B 17/102 |
| 2019/0025403 | A1* | 1/2019 | Hoffman ............... | H04B 17/103 |
| 2019/0356396 | A1* | 11/2019 | Kyosti ................... | H04B 17/15 |
| 2020/0049749 | A1* | 2/2020 | Gallhauser ......... | H01R 13/6592 |
| 2020/0191848 | A1* | 6/2020 | Grossmann ............ | G01R 29/10 |

FOREIGN PATENT DOCUMENTS

| | | |
|---|---|---|
| CN | 106851710 A | 6/2017 |
| WO | 2014/149610 A1 | 9/2014 |

* cited by examiner

*Primary Examiner* — Eva Y Puente
(74) *Attorney, Agent, or Firm* — Christensen O'Connor Johnson Kindness PLLC

(57) ABSTRACT

A system for performing multiple input/multiple output tests on a device under test has a central control unit and a least two antenna modules connected to the central control unit via a signal line, wherein the antenna modules comprise a radio-frequency antenna, a signal generation unit and at least one power measurement unit. Further, a test setup and a method for performing MIMO tests are shown.

19 Claims, 2 Drawing Sheets

SYSTEM, TEST SETUP AS WELL AS METHOD FOR PERFORMING MIMO TESTS

FIELD OF THE DISCLOSURE

The disclosure is directed to a system for performing multiple input/multiple output (MIMO) tests on a device under test, a test setup for performing MIMO tests as well as a method for performing Over-the-Air MIMO tests.

BACKGROUND

With the advent of 5G wireless telecommunication networks, MIMO tests with a large number of parallel channels have to be performed to test communication devices quickly and reliably.

Firstly, costs of the equipment for MIMO tests increase with the number of parallel channels. Further, the test quality decreases with increasing number of channels due to interference and crosstalk between cables extending from the central control unit with a signal generator to the plurality of antennas in an anechoic chamber.

Thus, there is the need to provide an easy to use and high quality system, test setup as well as method for performing MIMO tests on devices under test.

SUMMARY

For this purpose or others, a system for performing multiple input/multiple output tests on a device under test is provided. The system in some embodiments comprises a central control unit and a least two antenna modules connected to the central control unit via a signal line, wherein the antenna modules comprise a radio-frequency antenna, a signal generation unit and at least one power measurement unit.

With the system, Over-the-Air (OTA) tests can be performed.

By providing the antenna modules with a signal generation unit and a power measurement unit, the actual probing signal and the measured signals do not have to be transferred via a relatively long cable to the antennas and back. Thus, influences deteriorating the tests, like crosstalk and interference are reduced. Further, the number of cables may be reduced leading to an easy to use system.

The probing signal emitted by the antenna modules is airborne, i.e. electromagnetic radiation.

In an aspect, the central control unit and the antenna modules are configured to transmit via the signal line at least the following signals:

a reference signal from the central control unit to the antenna modules; and at least one measurement signal from the antenna modules to the central control unit.

This way, the antenna modules are provided with the same reference signal and transmit measurement results the to the central control unit for centralized processing.

The reference signal may be a signal of a local oscillator of the control unit or a clock signal for synchronizing local oscillators of the antenna modules.

In another aspect, the antenna modules are configured to emit a phase-coherent radio-frequency probing signal using at least the reference signal creating a very high and stable coherence.

For versatile processing at the central control unit, the at least one measurement signal is an analog signal or a digital signal.

It is also conceivable that an analog and a digital version of the measurement signal is transmitted to the central control unit.

In an embodiment, the central control unit and the antenna modules are configured to transmit via the signal line at least one of the following additional signals:

a control signal for the measurement to the antenna modules, a control signal for signal generation to the antenna modules, and an analog measurement signal with a reduced frequency compared to the measured radio-frequency signal to the central control unit.

This way, the probing signal and/or the measurement may be controlled precisely by the central control unit. The control signals may be analog or digital signals.

It is also possible that an analog control signal and a digital control signal are present.

The control signal for signal generation may include I/Q-data for the probing signal.

For example, each antenna module comprises a measurement path and a signal generation path, both being connected to the same radio-frequency antenna, providing small and cost-efficient antenna modules.

For high quality measurements, the signal line is a wired connection, for example via a single cable.

In an aspect, the antenna modules are configured to emit a probing signal being a continuous wave signal and/or lying in the microwave frequency range, i.e. between 1 GHz and 300 GHz, allowing a broad range of tests.

To improve package size further, the signal generation unit comprises a signal generator and/or a local oscillator.

For example, the signal generator or local oscillator receive the reference signal. In the former case, the central control unit may comprise a local oscillator.

In an embodiment, the power measurement unit includes at least one of a diode and a thermal RF measurement circuit or means, providing precise measurements.

In order to avoid interferences, the system comprises an anechoic chamber, wherein the antenna modules are arranged within the anechoic chamber.

The antenna modules may be arranged completely in the anechoic chamber, the central control unit may be outside of anechoic chamber.

For above purpose, a test setup for performing multiple input/multiple output tests is further provided. The test setup comprises, in some embodiments, a device under test and a system comprising a central control unit and a least two antenna modules connected to the central control unit via a signal line, wherein each of the antenna modules comprises a radio-frequency antenna, a signal generation unit and at least one power measurement unit.

The device under test is arranged within the anechoic chamber.

The features and advantage discussed in context of the system also apply to the test setup and vice versa.

Further, for above purpose, a method for performing multiple input/multiple output tests of a device under test is provided. In some embodiments, the method comprises the following steps:

generating a reference signal using a central control unit, transmitting the reference signal to at least two antenna modules, generating phase-coherent radio-frequency probing signals by the antenna modules based on at least the reference signal, and emitting the probing signal by the antenna modules towards the device under test.

The features and advantage discussed in context of the system also apply to the method and vice versa.

In an embodiment, a control signal for controlling the signal generation is generated by the central control unit and transmitted to the antenna modules, wherein the probing signals are generated based also on the control signal for controlling the signal generation, allowing precise control of the probing signal.

For reliable tests of the device under test, a communication signal from the device under test may be received by at least one of the antenna modules and the power of the communication signal is measured by the at least one of the antenna modules.

In an embodiment, a measurement signal is generated by the antenna module based on the measured power of the communication signal, wherein the measurement signal is transmitted to the central control unit allowing central processing of the measurements.

In an aspect, a control signal for controlling the measurement is generated by the central control unit and transmitted to the antenna modules, wherein the power measurement is performed based at least on the control signal for controlling the measurement. Thus, the same measurement parameters are applied by all antenna modules.

For a simplified setup, the signals transmitted between the central control unit and the antenna modules may be transmitted via a cable, for example a single cable is used to transmit the signals between the central control unit and each of the antenna modules.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
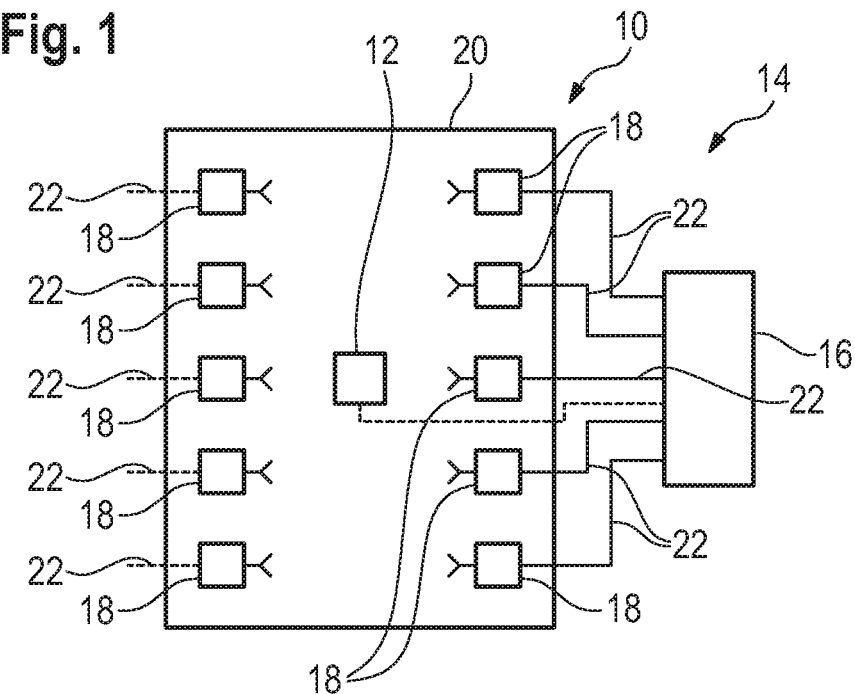
FIG. 1 shows schematically a representative test setup according to the disclosure comprising an embodiment of a system according to the disclosure.

FIG. 1 shows a test setup 10 comprising a device under test 12 and a system 14. The device under test 12 is a radio frequency communication device having multiple antennas capable of multiple input/multiple output (MIMO) communication. The device under test 12 may be a communication device for 5G telecommunication networks, for example 5G NR2 telecommunication networks. The device under test 12 may be a mobile phone or the like.

The system 14 for performing MIMO tests comprises in the shown embodiment a central control circuit or unit 16, a plurality of antenna modules 18 and an anechoic chamber 20. The central control unit 16 is arranged outside of the anechoic chamber 20, whereas the device under test 12 and the antenna modules 18 are fully positioned within the anechoic chamber 20.

Signal lines 22 connect the antenna modules 18 with the central control unit 16. For example, a single cable each is used to connect each one of the antenna modules 18 with the central control unit 16. For the sake of clarity, only the signal lines 22 on the right-hand side of the anechoic chamber 20 are shown in FIG. 1, whereas the signal lines 22 on the left-hand side are only illustrated in dashed lines. The cables of the signal lines 22 may be data cables, for example multicore cables or single-core cables. The device under test 12 may also be connected and controlled by the central control unit 16.

In the shown example, ten antenna modules 18 are provided in the system 14. Of course, any other number of antenna modules 18 is also conceivable.

Figure 2:
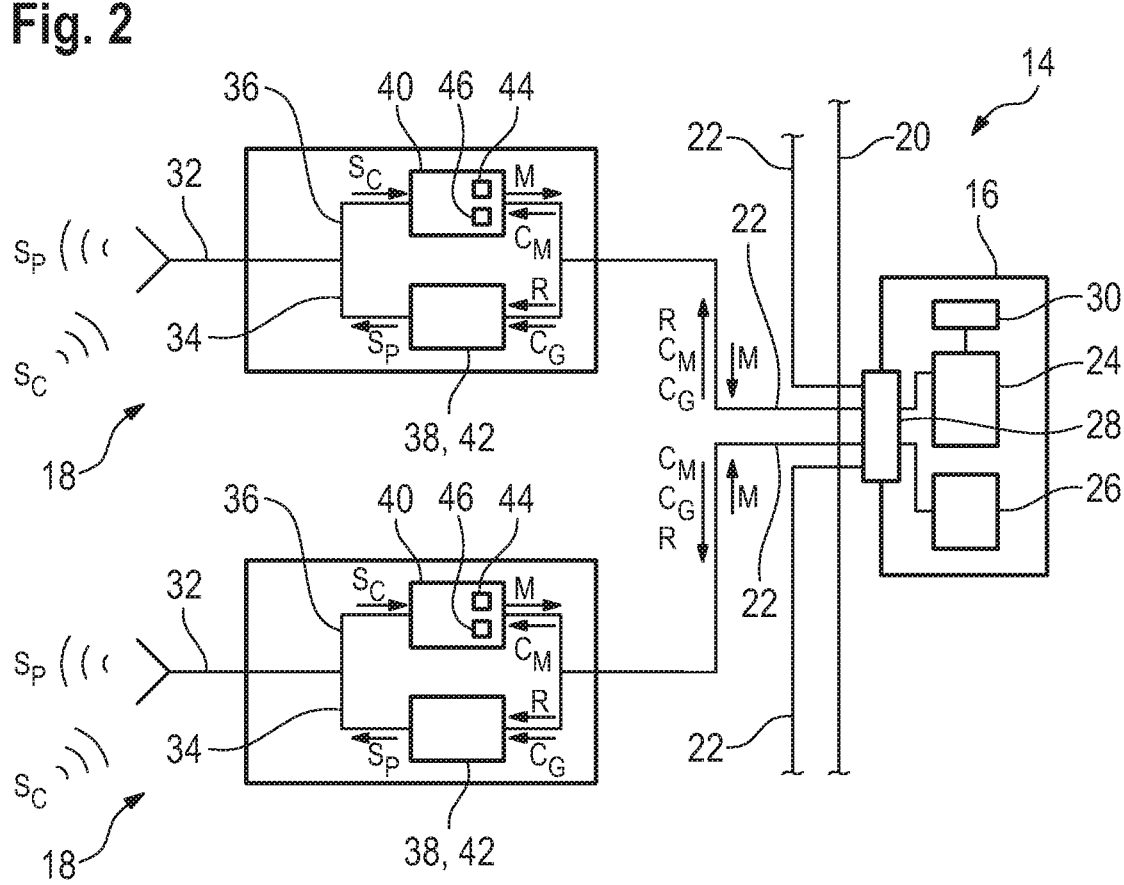
FIG. 2 shows schematically in more detail a part of the system of FIG. 1 according to a first embodiment.

FIG. 2 shows a more detailed view of two antenna modules 18 and the central control unit 16. The wall of the anechoic chamber 20 is also depicted, however the other antenna modules 18 have been omitted for clarity.

In the shown embodiment, the central control unit 16 comprises a control circuit, such as controller 24, a local oscillator 26 and an interface 28 for the signal lines 22. Of course, the central control unit 16 may also comprise a display 30 and/or input/output peripherals or means for communicating with a user. The display 30 may be controlled by the controller 24.

The controller 24 and the local oscillator 26 are connected to the interface 28 on one side. The interface 28 is, on the other side, connected to the signal lines 22 leading to the antenna modules 18 within the anechoic chamber 20.

Each antenna module 18 comprises a radio frequency antenna 32, a signal generation path 34, a measurement path 36, a signal generation unit 38 and a power measurement unit 40. The signal generation path 34 and the measurement path 36 are both connected to the radio frequency antenna 32.

The signal generation unit 38 comprises a signal generator 42 connected to the signal lines 22. The signal generation unit 38 is part of the signal generation path 34.

The measurement path 36 comprises the power measurement unit 40, which may include a diode 44 and/or a thermal radio frequency measurement circuit or means 46 for measuring the power of a signal received by the radio frequency antenna 32. The power measurement unit 40 is connected to the signal line 22, for example the same signal line 22 as the signal generation unit 38.

The radio frequency antenna 32 together with the signal generation unit 38 is configured to emit electromagnetic radiation in the microwave frequency range, i.e. between 1 GHz and 300 GHz, for example as a continuous wave signal into the anechoic chamber 20 towards the device under test 12 as a probing signal $S_P$.

Figure 3:
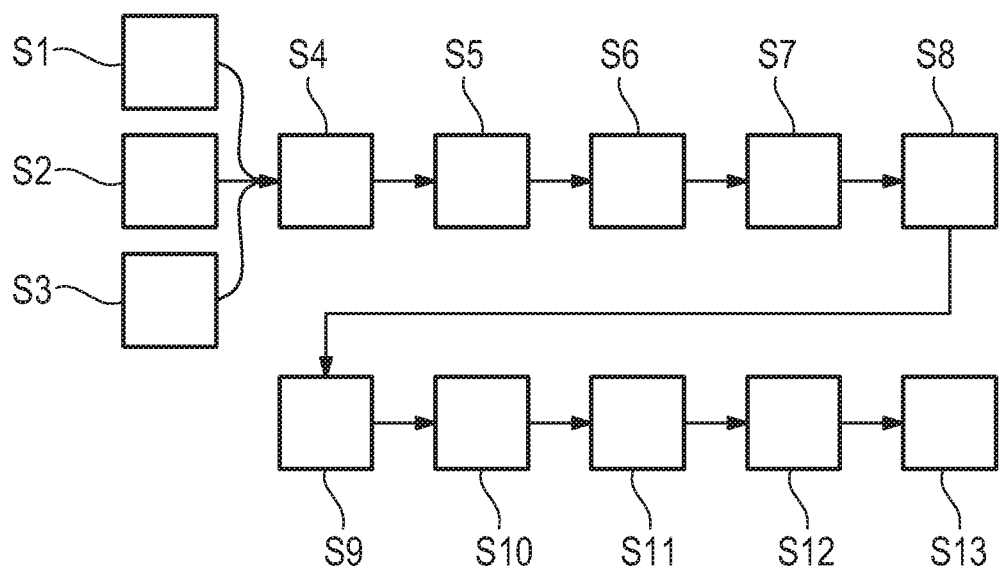
FIG. 3 shows a flow-chart of a representative method according to the disclosure.

FIG. 3 shows a flow-chart of a method for performing over the air MIMO output tests on the device under test 12 using the test setup 10, for example the system 14.

In a first step S1, the central control unit 16, for example the controller 24, generates a control signal $C_G$ for signal generation. The control signal $C_G$ includes information about the probing signal $S_P$ that is to be generated and emitted by the antenna modules 18. The control signal $C_G$ for signal generation may include I/Q-data for the probing signal $S_P$. The control signal for generation $C_G$ is, for example, based on input by a user of the system 14.

In step S2, which may be performed in parallel, before or after step S1, the central control unit 16 generates a reference signal R. In the embodiment of FIG. 2, the reference signal R is generated by the controller 24 using the local oscillator 26. The reference signal R may thus be a local oscillator signal.

In step S3, the central control unit 16, for example the controller 24, may also generate a control signal $C_M$ for the measurement. The control signal $C_M$ is used to provide measurement parameters or other information about the measurement to be performed by the antenna modules 18, for example the power measurement unit 40, to the antenna modules 18. This control signal $C_M$ may be generated before, in parallel and after step S1 and/or step S2.

The control signals $C_M$, $C_G$ and/or the reference signal R may be analog or digital signals. It is also possible, that an analog version and a digital version of one, two or each of the signals $C_M$, $C_G$ and R are generated and transmitted.

In step S4, the reference signal R and the control signals $C_G$, $C_M$ are transmitted to each of the antenna modules 18 via the signal lines 22. The control signal $C_G$ for signal generation and the reference signal R are received by the signal generation unit 38, i.e. the signal generator 42 of each of the antenna modules 18.

Based on the information contained in the reference signal R and the control signal $C_G$ for signal generation, the signal generation unit 38 of each of the antenna modules 18 generate a radio frequency probing signal $S_P$ (step S5). With the information contained in the reference signal R, the signal generation units 38 of the antenna modules 18 are capable and configured to generate the probing signal $S_P$ such that the probing signals $S_P$ of the antenna modules 18 are phase-coherent. The probing signal $S_P$ may be a continuous wave radio frequency signal in the microwave frequency range of 1 GHz to 300 GHz.

In step S6, the probing signal $S_P$ is transmitted to and emitted by the radio frequency antenna 32 of each of the antenna modules 18. Thus, the probing signal $S_P$ propagates over the air towards the device under test 12. Thus, a phase-coherent Over-the-Air test of the device under test 12 is achieved.

The device under test 12 itself emits in step S7 communication signals $S_C$ which are being received by each of the radio frequency antennas 32 of the antenna modules 18.

In step S8, the received communication signals $S_C$ are transmitted via the measurement path 36 to the power measurement unit 40.

The measurement unit 40 may have received the control signal for measurement $C_M$, if present, and performs a power measurement of the communication signal $S_C$ (step S9). The power measurement may be based on the information contained in the control signal $C_M$ for the measurement.

By performing the measurement, the power measurement unit 40 generates at least one measurement signal M, which may be an analog signal or a digital signal. It is of course possible that an analog and a digital version of the measurement signal M is generated.

The measurement signal M is then, in step S10, transmitted to the central control unit 16 via the signal lines 22.

It is also possible that the power measurement unit 40 generates an analog measurement signal M with a reduced frequency compared to the measured radio frequency signal. This analog measurement signal may also be transferred to the central control unit 16 via the signal lines 22 (step S11).

In step S12, the central control unit 16 processes the measurement signals M received from the antenna modules 18. The central control unit 16 may perform processing steps and/or may output a representation of one or more of the measurement signals, a combination of the measurement signals M or a result of the processing of the measurement signals M on the display 30.

Thus, using the test setup 10 with the system 14, an easy to use system 14 is provided, as the number of signal lines 22 and thus cables from the central control unit 16 to the antenna modules 18 is reduced. This improves the quality of the probing signals further, as interference in the cables is not possible.

Figure 4:
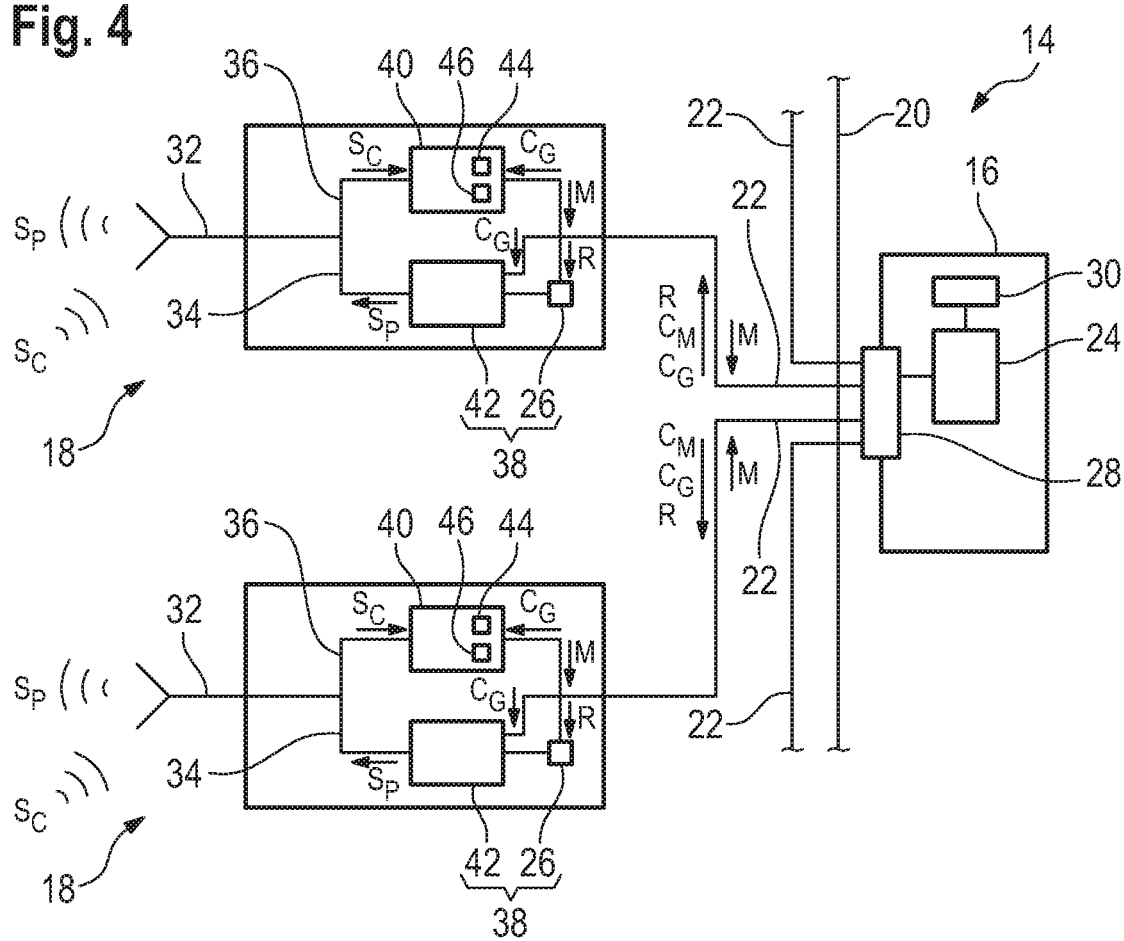
FIG. 4 shows schematically in more detail a part of the system of FIG. 1 according to a second embodiment.

FIG. 4 shows a second embodiment of the system 14, which corresponds to the first embodiment shown in FIG. 2. The same and functionally the same components are referred to with the same reference numerals and only the differences are discussed in the following. FIG. 4 corresponds to the view of FIG. 2.

In the second embodiment, the central control unit 16 does not use (or comprise) a local oscillator 26, but a local oscillator 26 is provided in each of the antenna modules 18. The local oscillator 26 of the antenna modules 18 is part of the signal generation unit 38.

Thus, the reference signal R generated by the central control unit 16 may be a trigger and/or clock signal for synchronizing the local oscillators 26 of the antenna modules 18. The reference signal R may be generated by the controller 24.

For the signal generation (step S5), the local oscillator 26 receives the reference signal R and the signal generator 42 still receives the control signal $C_G$. The signal generator 42 receives a signal from the local oscillator 26 and generates the probing signal $S_P$ based on the control signal $C_G$ and the signal received from the local oscillator 26, which in turn is based on the reference signal R. Except for this difference, the method shown in FIG. 3 remains unchanged.

Certain embodiments disclosed herein utilize circuitry (e.g., one or more circuits) in order to implement protocols, methodologies or technologies disclosed herein, operably couple two or more components, generate information, process information, encode signals, decode signals, transmit and/or receive signals, etc. Circuitry of any type can be used. For example, as described above, the test setup 10, the device under test 12, the central control unit 16 (e.g., controller 24, a local oscillator 26, interface 28, etc.) the antenna modules 18 (e.g., the signal generation unit 38, the power measurement unit 40, the signal generator 42, etc.), or other components of the system may include, in some embodiments, logic for implementing the protocols, technologies and methodologies described herein. This logic of these components can be carried out in circuitry that includes, for example, hardware or a combination of hardware and software. In some embodiments, logic of these components is carried out in software.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof.

In an embodiment, circuitry includes a processor (e.g., a microprocessor), a central processing unit (CPU), or a digital signal processor (DSP), and/or programmable memory. In an embodiment, circuitry includes one or more ASICs having a plurality of predefined logic components. In an embodiment, circuitry includes one or more FPGA having a plurality of programmable logic components. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In an embodiment, circuitry includes a baseband integrated circuit or applications processor integrated circuit or a similar integrated circuit in a server, a broadcast/streaming device, such as for example a cellular network device, an OTA network device, an OTT network device, a satellite network device, an internet protocol device, etc., and other network devices, or other computing devices. In an embodiment, circuitry includes one or more remotely located components. In an embodiment, remotely located components are operably coupled via wireless communication. In an embodiment, remotely located components are operably coupled via one or more receivers, transmitters, transceivers, or the like.

In an embodiment, circuitry includes one or more memory devices that, for example, store instructions or data. Non-limiting examples of one or more memory devices include volatile memory (e.g., Random Access Memory (RAM), cache memory, register memory, etc.), non-volatile memory (e.g., Read-Only Memory (ROM), flash drives, solid-state drives, etc.), or the like. It will be appreciated that where embodiments are described to use a computer-readable storage medium, other types of computer-readable storage media may be substituted for or used in addition to the computer-readable storage media described above.

The computer-readable media include cooperating or interconnected computer-readable media, which exist exclusively on a processing system or distributed among multiple interconnected processing systems that may be local to, or remote from, the processing system. The one or more memory devices can be coupled to, for example, one or more computing devices by one or more instructions, data, or power buses.

In an embodiment, circuitry may also include a computer-readable media drive configured to accept signal-bearing medium (e.g., computer-readable memory media, computer-readable recording media, or the like). In an embodiment, a program for causing a system or device to execute any of the disclosed methods can be stored on, for example, a computer-readable recording medium (CRMM), a signal-bearing medium, or the like.

It will be appreciated that one or more aspects of the methods set forth herein can be carried out in a computer system in some embodiments. In this regard, a program element is provided, which is configured and arranged when executed on a computer to carry out protocols, methodologies or technologies disclosed herein. The program element may be installed in memory, such as computer readable storage medium described above. The computer readable storage medium and the program element, which may comprise computer-readable program code portions embodied therein, may further be contained within a non-transitory computer program product.

As mentioned, various embodiments of the present disclosure may be implemented in various ways, including as non-transitory computer program products. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media, for example, as described above).

As should be appreciated, various embodiments of the present disclosure may be implemented as methods, apparatus, systems, computing devices, computing entities, and/or the like, as have been described elsewhere herein or claimed below. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Various embodiments are described above with reference to block diagrams and/or flowchart illustrations of apparatuses, methods, systems, and computer program products. It should be understood that one or more blocks (or each block) of any of the block diagrams and/or flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks and/or carry out the methods described herein.

These computer program instructions may also be stored in a computer-readable memory, such as the computer-readable storage media described above, that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks and/or carry out the methods described herein. It will be appreciated that the term computer or computing device can include, for example, any computing device or processing structure, circuitry, etc., including but not limited to those described above regarding circuitry.

Accordingly, blocks of the block diagrams and/or flowchart illustrations support various combinations for performing the specified functions, combinations of operations for performing the specified functions and program instructions for performing the specified functions. Again, it should also be understood that each block of the block diagrams and flowchart illustrations, or combinations of blocks in the block diagrams and/or flowchart illustrations, could be implemented by special purpose hardware-based computer systems or circuits, etc., that perform the specified functions or operations, or combinations of special purpose hardware and computer instructions.

According to some embodiments, many individual steps of a process may or may not be carried out utilizing the computer systems described herein, and the degree of computer implementation may vary, as may be desirable and/or beneficial for one or more particular applications.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" means "A and/or B", namely "A" alone, "B" alone or "A and B". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed The embodiments of the invention in which an exclusive property or privilege is claimed are defined as follows:

1. A system for performing multiple input/multiple output tests on a device under test, comprising:
    a central control circuit and a least two antenna modules connected to the central control circuit via a signal line, wherein the antenna modules comprise a radio-frequency antenna, a signal generation unit and at least one power measurement unit, wherein each antenna module comprises a measurement path and a signal generation path, both being connected to the same radio-frequency antenna.

2. The system according to claim 1, wherein the central control circuit and the antenna modules are configured to transmit via the signal line at least the following signals:
    a reference signal from the central control circuit to the antenna modules; and
    at least one measurement signal from the antenna modules to the central control circuit.

3. The system according to claim 2, wherein the antenna modules are configured to emit a phase-coherent radio-frequency probing signal using at least the reference signal.

4. The system according to claim 2, wherein the at least one measurement signal is an analog signal or a digital signal.

5. The system according to claim 1, wherein the central control circuit and the antenna modules are configured to transmit via the signal line at least one of the following additional signals:
    a control signal for the measurement;
    a control signal for signal generation; and
    an analog measurement signal with a reduced frequency compared to the measured radio-frequency signal.

6. The system according to claim 1, wherein each antenna module comprises a measurement path and a signal generation path, both being connected to the same radio-frequency antenna.

7. The system according to claim 1, wherein the signal line is a wired connection.

8. The system according to claim 1, wherein the antenna modules are configured to emit a probing signal being a continuous wave signal.

9. The system according to claim 1, wherein the antenna modules are configured to emit a probing signal in the microwave frequency range.

10. The system according to claim 1, wherein the signal generation unit comprises at least one of a signal generator and a local oscillator.

11. The system according to claim 1, wherein the power measurement unit includes at least one of a diode and a thermal RF measurement circuit.

12. The system according to claim 1, wherein the system comprises an anechoic chamber, wherein the antenna modules are arranged within the anechoic chamber.

13. A test setup for performing multiple input/multiple output tests, comprising:
    a device under test;
    a central control circuit; and
    at least two antenna modules connected to the central control circuit via a signal line, wherein each of the antenna modules comprises a radio-frequency antenna, a signal generation unit and at least one power measurement unit, and wherein each antenna module comprises a measurement path and a signal generation path, both paths being connected to the same radio-frequency antenna.

14. A method for performing multiple input/multiple output tests of a device under test, comprising:
    generating a reference signal using a central control circuit;
    transmitting the reference signal to at least two antenna modules;
    generating phase-coherent radio-frequency probing signals by the antenna modules based on at least the reference signal;
    emitting the probing signals by the antenna module over the air towards the device under test; and
    wherein a control signal for controlling the signal generation is generated by the central control circuit and transmitted to the antenna modules, wherein the probing signals are generated based also on the control signal for controlling the signal generation.

15. The method according to claim 14, wherein a communication signal from the device under test is received by at least one of the antenna modules and the power of the communication signal is measured by said at least one of the antenna modules.

16. The method according to claim 15, wherein a measurement signal is generated by the antenna module based on the measured power of the communication signal, wherein the measurement signal is transmitted to the central control circuit.

17. The method according to claim 15, wherein a control signal for controlling the measurement is generated by the central control circuit and transmitted to the antenna modules, wherein the power measurement is performed based at least on the control signal for controlling the measurement.

18. The method according to claim 14, wherein the signals transmitted between the central control circuit and the antenna modules are transmitted via a cable.

19. The method according to claim 18, wherein a single cable is used to transmit the signals between the central control circuit and each of the antenna modules.

* * * * *